United States Patent Office 3,168,570
Patented Feb. 2, 1965

3,168,570
PREPARATION OF KETONES
David W. Marshall, Ponca City, Okla., assignor to Continental Oil Company, Ponca City, Okla., a corporation of Delaware
No Drawing. Filed July 24, 1961, Ser. No. 125,996
5 Claims. (Cl. 260—593)

This invention relates to a novel method of making ketones from aluminum alkyls and carbon dioxide.

The reaction between aluminum alkyl and carbon dioxide produces alkanoic acids. The reaction conditions which have been explored for this reaction produce varying quantities of the acid. However, up to the present time, as far as we know no one has been able to obtain any other valuable compound in significant quantity from such a reaction. This is mainly due to the fact that heretofore investigations in this field have been directed to determining how to obtain high yields of acid in an economical and efficient manner for commercialization. Accordingly, the trend has been to avoid severe reaction conditions because of the high cost of operation which would be required in such case.

Quite unexpectedly, it was found that the period of time for reacting aluminum alkyl and carbon dioxide is important in bringing about the production of valuable ketone products. To the best of my knowledge, no prior worker has been able to obtain a ketone product in the yields realized by me.

Therefore an object of this invention is to produce ketones from aluminum alkyl and carbon dioxide.

Another object is to obtain ketones from the aforesaid reaction in high yields.

Other objects and advantages of the present invention will become apparent from the following description and explanation thereof.

In accordance with the present invention, aluminum alkyl having alkyl groups containing about 2 to 30 carbon atoms or higher is reacted with carbon dioxide at a temperature of about 200 to 300° C., a pressure of about 3,500 to 10,000 p.s.i.g. and for a period of about 50 to 100 hours.

The aluminum alkyl has the following structural formula:

wherein $R_1$, $R_2$ and $R_3$ may be the same or different alkyl groups containing about 2 to 30 carbon atoms or higher, preferably about 4 to 12 carbon atoms.

In one method of preparation, these aluminum trialkyls are obtained through the reaction of a low molecular weight aluminum alkyl with a lower olefin, for example, ethylene, to form the so-called aluminum trialkyl growth product having the structural formula set forth above. The growth reaction is carried out, for example, by passing ethylene through aluminum triethyl, preferably in the presence of a diluent under a wide variety of reaction conditions, e.g., 65°–150° C. and 200–5,000 p.s.i.g., preferably 90°–120° C. and 1,000–3,500 p.s.i.g. It is to be understood that, instead of employing triethylaluminum as the starting trialkylaluminum in the above reaction, other low molecular weight alkyl ($C_2$–$C_4$) aluminum compounds, such as tripropylaluminum, tributylaluminum, triisobutylaluminum, diethylaluminum hydride, ethylaluminum dihydride, etc., can be employed; and in lieu of ethylene, other low molecular weight aliphatic mono-1-olefins, such as propylene and the like can be substituted. Generally, $C_2$–$C_4$ olefins are preferred as the growth hydrocarbon compound.

It is within the scope of the invention to employ all or any portion of the growth product and also any of the individual aluminum trialkyl compounds in the method of this invention. Specific examples of such compounds are aluminum tributyl, aluminum tri-n-pentyl, aluminum tri-n-hexyl, aluminum tri-n-heptyl, aluminum tri-n-octyl, aluminum tri-n-nonyl, aluminum tri-n-decyl, aluminum tri-n-dodecyl, etc. The alkyl groups in the aluminum compound can be all straight chain or all isomeric groups or mixtures of the two types.

The aluminum alkyl is preferably reacted with carbon dioxide in a nonreactive solvent. The solvent facilitates contact between the aluminum alkyl and carbon dioxide and provides a method of controlling reaction conditions. The ketone produced in the reaction can be of much higher boiling point than the reactants; and without the solvent, it may be difficult to remove the product from the reaction vessel. The solvent includes such classes of compounds as saturated hydrocarbons and aromatic hydrocarbons. The solvent is one that boils below or above the desired reaction product to facilitate separation by distillation and the like. Specific examples of solvents are hexane, heptane, decane, octane, dodecane, toluene, benzene, cumene, and the like.

The amount of carbon dioxide employed in the reaction relative to the aluminum alkyl is about 2 to 20 moles of the former to about 1 mole of the latter, and preferably about 1 to 10 moles of the former to about 1 mole of the latter. The solvent, when used, comprises about 1 to 4 parts by volume per unit volume of aluminum alkyl.

The aluminum alkyl is reacted with carbon dioxide at a temperature of about 200 to 300° C., preferably about 220 to 280° C. The pressure of reaction is high enough to cause the formation of ketone, namely, about 3,500 to 10,000 p.s.i.g., preferably about 4,000 to 6,000 p.s.i.g. At the conditions of temperature and pressure just mentioned, it requires a relatively long time for the ketone to be produced in significant quantity. The reaction length is from about 50 to 100 hours, preferably about 60 to 80 hours.

The conditions of reaction are preferably maintained moisture-free to avoid a diminution of yield of ketone. The carbon dioxide and solvent are preferably dehydrated separately before being combined for reaction. Any suitable dehydrating material can be used which does not affect adversely the carbon dioxide or solvent, for example, calcium hydride, sodium, and the like.

To provide a better understanding of the present invention, reference will be had to specific examples thereof.

Example 1

0.297 mole of aluminum triethyl, 40 ml. of diethyl ether dried with sodium, and 200 ml. of nonane dried with calcium hydride were charged to a nitrogen purged 500-ml. autoclave. The contents were heated to 244° C. and pressured with $CO_2$ until a pressure of 4,500 p.s.i.g. was reached. The purity of the $CO_2$ used was 99.7 mole percent. The temperature and pressure was maintained over a 5-hour period. The autoclave was cooled and depressured. Dilute HCl was used to hydrolyze the reaction mass. The aqueous phase was extracted with diethyl ether. The hydrocarbon layer was neutralized with aqueous NaOH solution and then reacidified. The resultant mixture was extracted with diethyl ether. The ether extracts were combined and an analysis revealed a yield of 18 percent propionic acid. The hydrocarbon layer revealed only ether and n-nonane.

Example 2

The autoclave was purged with nitrogen and then 500 ml. of n-heptane were added thereto. 0.168 mole of aluminum tri-n-hexyl were added under a nitrogen blanket to the autoclave. The autoclave was heated to 250° C. and pressured with $CO_2$ to 4,000 p.s.i.g. 99.7 mole percent $CO_2$ was used. The autoclave was held at reaction level for 3½ hours and then cooled and vented. The reaction mixture was hydrolyzed with dilute $H_2SO_4$ and then neutralized with dilute NaOH. The hydrocarbon layer was extracted three times and the extracts combined. The resultant mixture was extracted with diethyl ether. The ether was then stripped from the acid. The yield of n-haptanoic acid was 37.3 percent, but no ketone was found.

*Example 3*

The procedure in Example 2 was employed except that a temperature of 25° C., a pressure of 1,300 p.s.i.g. and a reaction time of 12 hours were used. The reactants were added in the following amounts:

0.165 mole of aluminum trihexyl
200 mole of n-hexane
99 mole percent $CO_2$

The yield of acid was 28 percent, but no ketone was found.

*Example 4*

The procedure of Example 2 was used except for the following:

Temperature_____ 100° C.
Pressure_____ 1,300 p.s.i.g.
Time_____ 12 hours.

0.097 mole of aluminum trihexyl
600 ml. of n-hexane
99+ mole percent $CO_2$

The yield of n-heptanoic acid was 34 percent, but no ketone was found.

*Example 5*

The procedure of Example 2 was used except for the following:

Temperature_____ 220–240° C.
Pressure_____ 4,500 p.s.i.g.
Time_____ 5 hours.

0.127 mole of aluminum trihexyl
500 ml. n-hexane
40 ml. ethyl ether
99+ mole percent $CO_2$ A yield of 40% heptanoic acid was obtained, but no ketone.

*Example 6*

The procedure of Example 2 was used except for the following:

Temperature_____ 240–250° C.
Pressure_____ 4,800 p.s.i.g.
Time_____ 72 hours.

0.047 mole aluminum trihexyl
100 ml. n-undecane
99+ mole percent $CO_2$

The yield of n-heptanoic acid was 18.98 percent, and di-n-hexyl ketone was 65 percent.

It will be noted that Example 6 resulted in a high yield of ketone and that the conditions were changed drastically to obtain the same.

Having thus described the invention by providing specific examples thereof, it is to be understood that no undue limitations or restrictions are to be drawn by reason thereof and that many variations and modifications are within the scope of the invention.

I claim:

1. A process of preparing ketones which comprises reacting an aluminum trialkyl having alkyl groups containing about 2 to 30 carbon atoms with carbon dioxide at a temperature of about 200° to 300° C., a pressure of about 3,500 to 10,000 p.s.i.g. and for a period of about 50 to 100 hours, hydrolyzing the reaction mixture, and separating the ketones from the hydrolyzed reaction mixture.

2. A process of preparing ketones which comprises reacting an aluminum trialkyl having alkyl groups containing about 2 to 30 carbon atoms with carbon dioxide at a temperature of about 220° to 280° C., a pressure of about 4,000 to 6,000 p.s.i.g. and for a period of about 60 to 80 hours, hydrolyzing the reaction mixture, and separating the ketones from the hydrolyzed reaction mixture.

3. The process of claim 2 being further characterized by the additioinal presence of a nonreactive hydrocarbon solvent.

4. A process of preparing di-n-hexyl ketone which comprises reacting aluminum tri-n-hexyl with carbon dioxide in the presence of a nonreactive hydrocarbon solvent at a temperature of about 220 to 280° C., a pressure of about 4,000 to 6,000 p.s.i.g. and for a period of about 60 to 80 hours, hydrolyzing the reaction mixture, and separating di-n-hexyl ketone from the hydrolyzed reaction product.

5. A process of preparing di-n-hexyl ketone which comprises reacting aluminum tri-n-hexyl with carbon dioxide in the presence of a nonreactive hydrocarbon solvent at a temperature in the order of about 240 to 250° C., a pressure of about 4,800 p.s.i.g. and for a period of about 72 hours, hydrolyzing the reaction mixture, and separating di-n-hexyl ketone from the hydrolyzed reaction product.

References Cited in the file of this patent

UNITED STATES PATENTS 2,827,458     Mirviss et al. _____ Mar. 18, 1958

OTHER REFERENCES

Zakharkin et al.: Chem. Abstracts, vol. 52, page 11738 (1958).